United States Patent [19]
LaForge

[11] Patent Number: 5,153,496
[45] Date of Patent: Oct. 6, 1992

[54] CELL MONITOR AND CONTROL UNIT FOR MULTICELL BATTERY

[75] Inventor: David H. LaForge, Kensington, Calif.

[73] Assignee: Baxtrer International Inc., Deerfield, Ill.

[21] Appl. No.: 589,092

[22] Filed: Sep. 27, 1990

[51] Int. Cl.⁵ .............................................. H02J 7/00
[52] U.S. Cl. ...................................... 320/17; 320/13; 320/18
[58] Field of Search ............................. 320/17, 13, 18

[56] References Cited

U.S. PATENT DOCUMENTS

| | | | |
|---|---|---|---|
| 3,928,791 | 12/1975 | Mullersman | 320/2 |
| 3,997,830 | 12/1976 | Newell et al. | 320/5 |
| 4,016,474 | 4/1977 | Mason | 320/15 |
| 4,079,303 | 3/1978 | Cox | 320/17 |
| 4,238,721 | 12/1980 | DeLuca et al. | 320/18 |
| 4,281,278 | 7/1981 | Bilsky et al. | 320/13 |
| 4,313,078 | 1/1982 | Bilsky et al. | 320/15 |
| 4,388,584 | 6/1983 | Dahl et al. | 320/48 |
| 4,394,611 | 7/1983 | Fallon et al. | 320/21 |
| 4,484,130 | 11/1984 | Lowndes et al. | 320/17 |
| 4,575,670 | 3/1986 | Hignutt | 320/17 |
| 4,651,080 | 3/1987 | Wallace | 320/17 |
| 4,709,202 | 11/1987 | Koenck et al. | 320/43 |
| 4,792,743 | 12/1988 | Tsujino et al. | 320/15 |
| 4,967,136 | 10/1990 | Nofzingor | |
| 5,003,244 | 3/1991 | Davis | 320/17 |
| 5,049,803 | 9/1981 | Palanisamy | 320/20 |

FOREIGN PATENT DOCUMENTS

| | | |
|---|---|---|
| 2559364 | 7/1977 | Fed. Rep. of Germany. |
| 2109182 | 12/1984 | United Kingdom. |

Primary Examiner—Steven L. Stephan
Assistant Examiner—Thomas M. Dougherty
Attorney, Agent, or Firm—McCubbrey, Bartels, Meyer & Ward

[57] ABSTRACT

A cell monitoring and control circuit for a multicell battery comprises a cell access switch coupled to the cells of the battery for electronically accessing individual cells of the battery and a monitoring and control circuit coupled to the cell access switch for electronic communication with the cells. The circuit is coupled to the battery for providing electric power and constitutes an insignificant current drain on the battery. The circuit senses the voltage state of each cell and controls the charging of each cell and provides End-of-Discharge and End-of-Charge signals.

18 Claims, 5 Drawing Sheets

CELL MONITOR AND CONTROL UNIT FOR MULTICELL BATTERY

FIELD OF THE INVENTION

The present invention relates generally to the field of battery monitoring and more particularly to the field of the monitoring and control during discharge and charge of a multicell battery.

BACKGROUND OF THE INVENTION

Rechargeable, or secondary, batteries are typically multicell series-connected to produce practical output voltages. During charging of the battery, the low capacity cells will charge to capacity first and then overcharge. If this occurs while overall battery voltage is still below the end-of-charge threshold of the battery, and if the cell chemistry has poor inherent overcharge tolerance, the battery will be damaged. During discharge, the lowest capacity cells will be exhausted while the other cells still maintain charge. Power will continue to be delivered by the charged cells, but the exhausted cells will reverse, resulting in a decrease in battery capacity.

Lead-acid and sealed NiCd batteries have tolerance to mild overcharging through inherent absorption of overcharge by competing chemical reactions. These types of batteries thus automatically balance the overcharge, becoming somewhat self-leveling (or charge-equalizing). This is an important factor contributing to the commercial popularity of these types of batteries because the battery can then be treated as a single unit which does not require monitoring of each individual cell.

During discharge, if the use of the batteries involves deep discharges, then in order to avoid discharge reversal it is necessary to match the capacities of the individual cells. However, in NiCd batteries, even after matching the cells, periodic cell-by-cell deep discharges are needed to realize full cell output and lifetime.

Silver-zinc batteries are significantly more powerful than NiCd batteries (producing approximately three times the power per pound on discharge). This type of battery has not been commercially popular primarily because of its extremely low tolerance to overcharge. That is, if overcharged, silver-zinc batteries self-destruct through disordered charges in the cells, rendering the battery useless. This extreme sensitivity to overcharge thus requires a careful monitoring of each individual cell during charging to insure that no cell is overcharged. For a typical silver-zinc battery maintenance interval of thirty charge/discharge cycles, it is prohibitively cumbersome and troublesome to charge each cell individually.

Prior art approaches to voltage monitoring of individual cells have used complicated circuits connected to each cell. Many components were necessary for each cell because of the widely different possible potentials of the cells. Further complication was added because if the battery itself is used to power a monitoring circuit, cells near the positive end of the battery require a different type of circuit from those cells near the negative end. Prior art devices also typically require a multipole disconnect circuit to avoid self-discharge of the battery through the devices when they are on standby.

SUMMARY OF THE INVENTION

Accordingly, in order to provide an active means of maintaining the charge of individual cells of a multicell battery in a balanced voltage state, and also to achieve the practical and commercial utilization of the more powerful batteries of the silver-zinc type which have no inherent overcharge tolerance, the present invention provides a simple, inexpensive, low-power, easy to use apparatus having the following objects:

It is a principal object of the present invention to provide an apparatus to monitor and control the discharging and charging of multicell batteries.

It is a further object of the present invention to individually monitor and control each cell of a multicell battery in a simple and easy to use circuit.

It is still a further object of the present invention to provide such an apparatus which is powered by the subject battery and is not a significant drain on the subject battery.

It is also a further object of the present invention to protect from overcharge those batteries having little or no inherent overcharge tolerance.

It is yet a further object of the present invention to render such batteries self-leveling in a simple and easy to use circuit.

It is another object of the present invention to signal, during battery discharge, the approaching exhaustion of the weakest cell in the battery.

It is also another object of the present invention to signal, during charging of the battery, full charge of the most highly charged cell and to signal the presence of any defective cells.

It is still another object of the present invention to avoid differentially discharging and draining the individual cells.

It is yet another object of the present invention to individually discharge all cells completely to remove polarization effects.

The present invention is a cell monitoring and control circuit for a multicell battery. It comprises a cell access switch coupled to the cells of the battery for electronically accessing individual cells of the battery and a monitoring and control circuit coupled to the cell access switch for electronic communication with the cells. The circuit is coupled to the battery for providing electric power and constitutes an insignificant current drain on the battery. The circuit senses the voltage state of each cell and controls the charging of each cell providing End-of-Discharge and End-of-Charge signals.

In addition to achieving all the objects listed above, the present invention can also provide control over variable charging rates (rapid, pulsed, and top-up), an indication of battery charge state when under a known load, and a record of discharging and charging times for individual cells.

A further understanding of the nature and advantages of the present invention may be realized by reference to the Detailed Description of the Invention and the attached drawings.

DETAILED DESCRIPTION OF THE INVENTION

Figure 1:
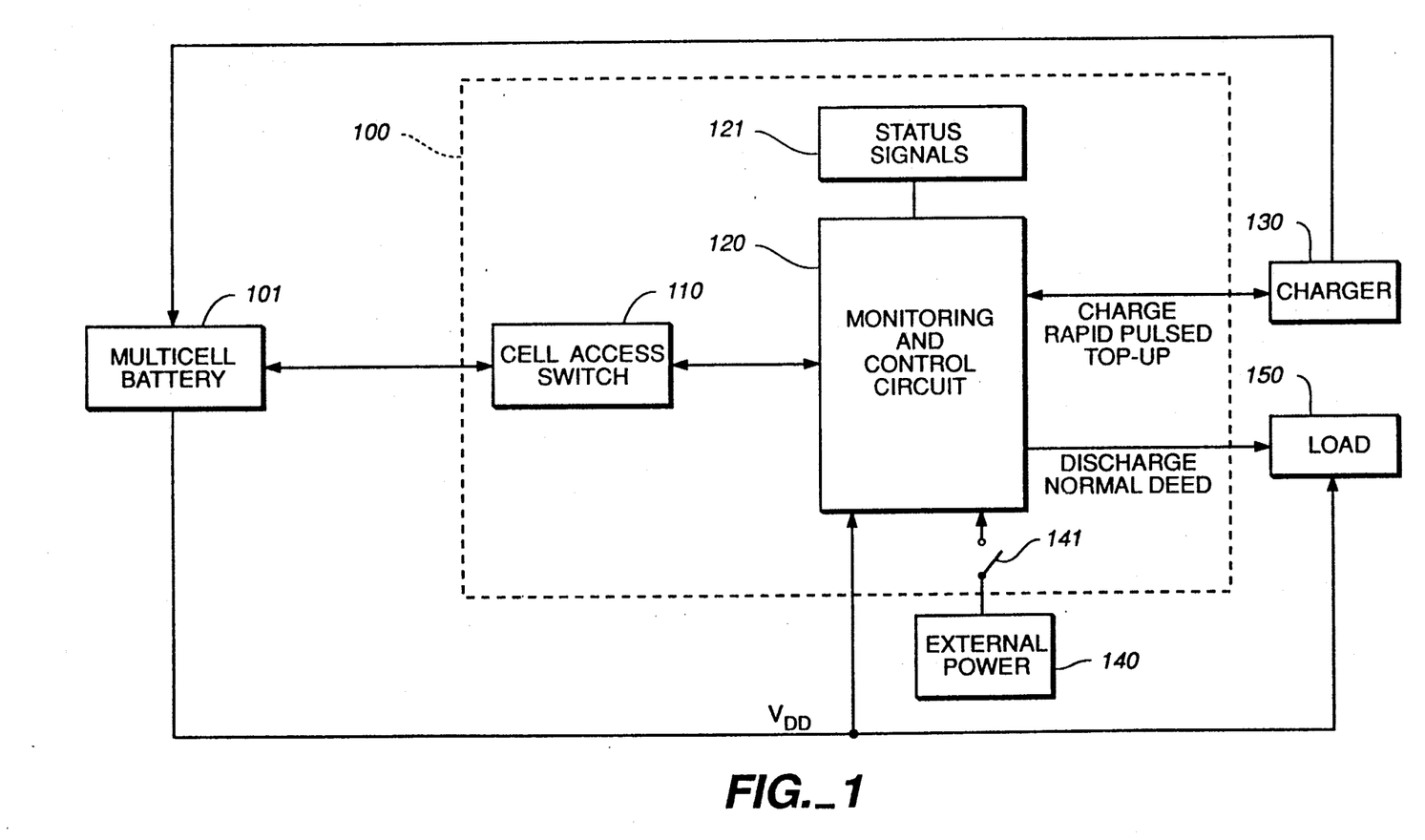
FIG. 1 is a schematic block diagram of a circuit according to the present invention connected to a multicell battery.

FIG. 1 is a schematic block diagram of a circuit 100 according to the present invention connected to a multi-cell battery 101. A cell access switching means 110 connects to each cell in battery 101 providing controllable access to each individual cell. Cell access switching means 110 can be permanently coupled to battery 101 and does not draw significant current from battery 101. Circuit 100 is powered only when battery 101 is either charging or discharging. If circuit 100 is not powered, cell access switching means 110 is in a standby state.

Monitoring and control (MC) circuit means 120 is coupled to cell access switching means 110. MC circuit means 120 senses each cell voltage sequentially through cell access switching means 110. During discharge to a representative load 150, if a cell's voltage falls below a preset discharge threshold, an active End-of-Discharge (EoD) pulse is generated at 121. Thus, the problem of the different cell offset voltages is solved and differential drainage of the cells is avoided. After discharge, MC circuit means 120 can also perform a "deep discharge" of the cells for maintenance purposes.

For low voltage batteries, there may be instances (for example, after deep discharge) where battery 101 cannot provide the necessary power to circuit 100. In such cases, an external power supply 140 can be switched on through switch 141.

MC circuit means 120 also monitors and controls charging of battery 101. For a rapid charge procedure by charger 130, when the highest charged cell passes a preset End-of-Charge (EoC) voltage, rapid charge is terminated and charger 130 is controlled to produce a lower "top-up" current. When the total battery voltage reaches EoC×N volts (where N is the number of cells in battery 101), an EoC signal is generated at 121 and charger 130 is shut off automatically by MC circuit means 120. Thus circuit 100 provides a self-leveling function for battery 101 and protects battery 101 from overcharging. For a pulsed rapid charge procedure, MC circuit means 120 similarly controls the charging process. In addition, MC circuit means 120 can detect potentially defective cells by using different cell voltage thresholds during and between pulses. This is because defective cells show excessive dynamic resistance to the pulsed charge. Defect signals are generated at 121.

Figure 2:
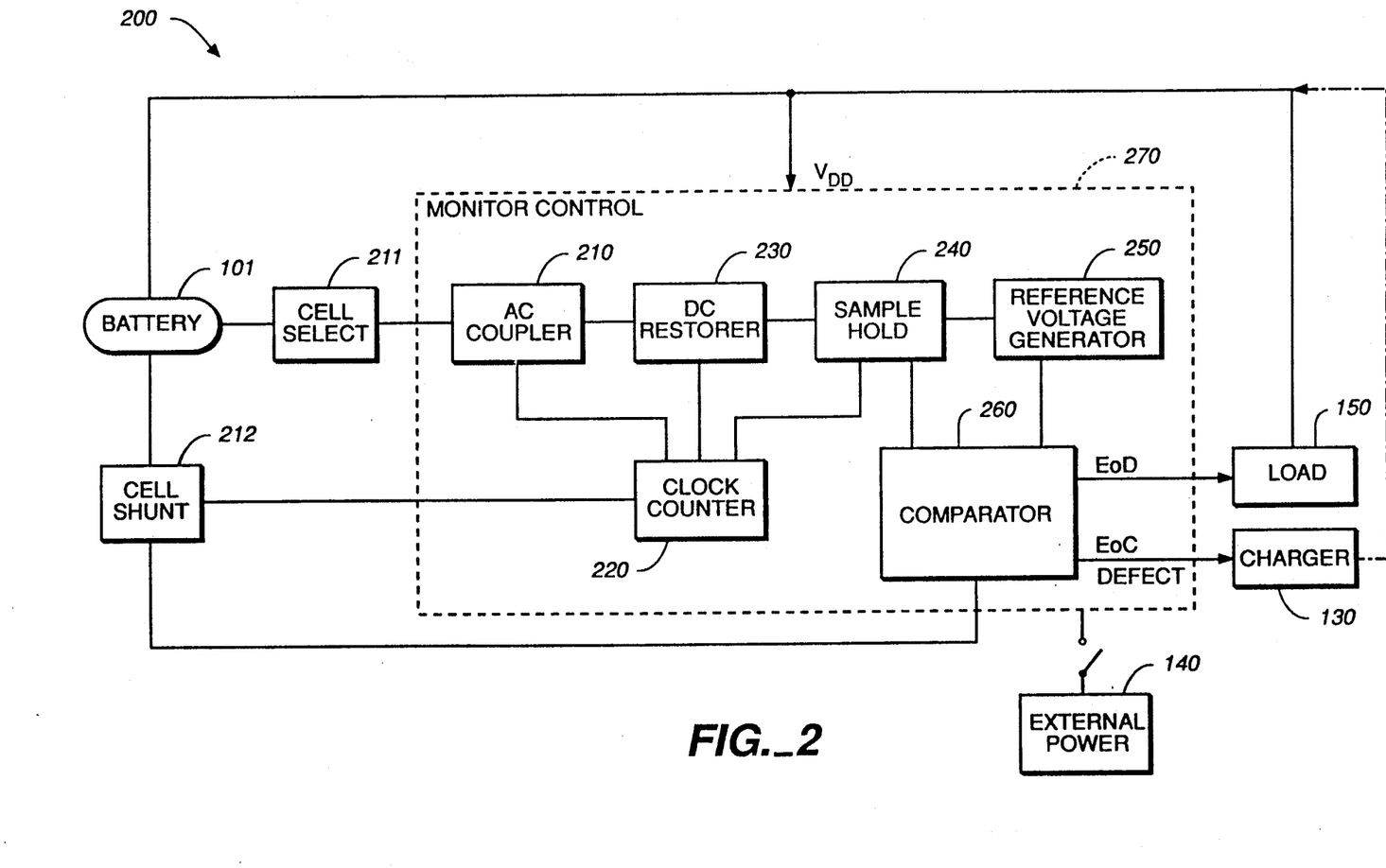
FIG. 2 is a schematic block diagram illustrating component functional devices in an embodiment of the present invention.

FIG. 2 is a functional schematic block diagram of an embodiment of the present invention to the next level of detail. The circuit of the present invention 200 is shown with subject battery 101, load 150, and charger 130. A cell shunt 212 and a cell select switch 211 are coupled to the individual cells (not shown) of battery 101. Monitor and control (MC) unit 270 is coupled to cell select switch 211 and to cell shunt 212. MC unit 270 is also coupled to battery 101 to be powered by battery 101. MC unit 270 includes an AC coupler 210 coupled to a DC restorer 230 which in turn is coupled to a sample and hold circuit 240, all of which are coupled to a clock counter 220. Clock counter 220 is also coupled to cell shunt 212. Sample and hold circuit 240 is further coupled to a reference voltage generator 250 and to a comparator 260 which is also coupled to reference voltage generator 250. Load 150 and charger 130 are controlled by MC unit 270 through connections to comparator 260. Battery 101 drives load 150 under the monitoring and control of circuit 200. Charger 130 charges battery 101 under the monitoring and control of circuit 200.

In operation, individual cell voltages are accessed by a combination of AC coupling, DC restoration, and sample/hold functions controlled by counter 220 running as a 4-step counter.

During discharge to run load 150, an End-of-Discharge (EoD) voltage threshold is preselected and produced by reference voltage generator 250. This threshold voltage is then compared by comparator 260 with the voltage of each cell as accessed by cell select 211, AC coupler 210, DC restorer 230, and sample and hold circuit 240 under the control of clock counter 220. If a cell falls below the threshold voltage, then an EoD signal is generated by comparator 260. Thus MC unit 270 has monitored the differential voltages of battery 101 for each individual cell in relation to a predetermined threshold.

After normal discharge, cell shunt 212 can be used to discharge all cells in battery 101 separately for battery maintenance purposes and to remove any polarization or "memory" from the cells. Battery 101 is first discharged to a normal EoD voltage using an external load. Then the external load is removed, reference voltage generator 250 sets the discharge threshold to a deep discharge level and the cells are shunted through cell shunt 212. If N times the recommended cell voltage is still sufficient to run circuit 100 (typically 8 volts for an 8 cell battery), then circuit 100 will continue to monitor battery 101 using power $V_{DD}$ from battery 101. If battery 101 is too weak to power circuit 200, an external power source 140 can be connected to continue monitoring and control of battery 101.

Further, circuit 200 can warn of impending discharge of the weakest cell by setting the EoD threshold at a value corresponding to the end of the "plateau" (steady voltage output) region of battery 101.

During charging, battery 101 is coupled to charger 130 which is controlled by circuit 200 under the monitoring of battery 101 by circuit 200. Charging may be rapid, pulsed rapid, and top-up. Reference voltage generator 250 produces a preselected End-of-Charge (EoC) voltage. When a cell reaches EoC, rapid charge ends and a slower top-up charge is produced by charger 130 under the control of MC unit 270. As each cell in battery 101 reaches full charge, the top-up current is shunted by cell shunt 212 to prevent the cells from overcharging. Under pulsed charging, any cell which exhibits excessive dynamic resistance is deemed defective and MC unit 270 signals such defect.

Figures 3, 3B:
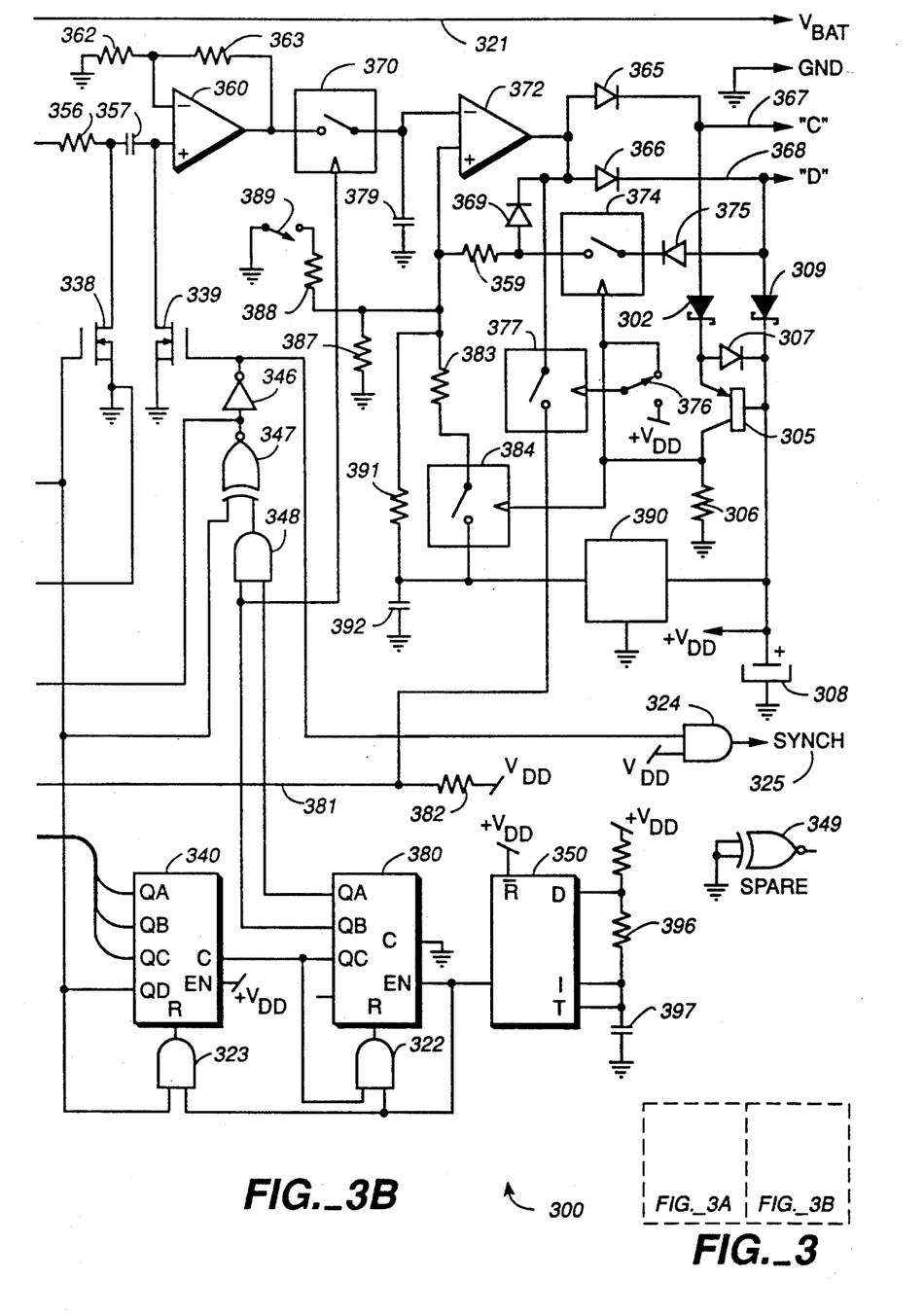
FIGS. 3A and 3B are a detailed schematic of an embodiment of the present invention showing electronic components.
Figure 3A:
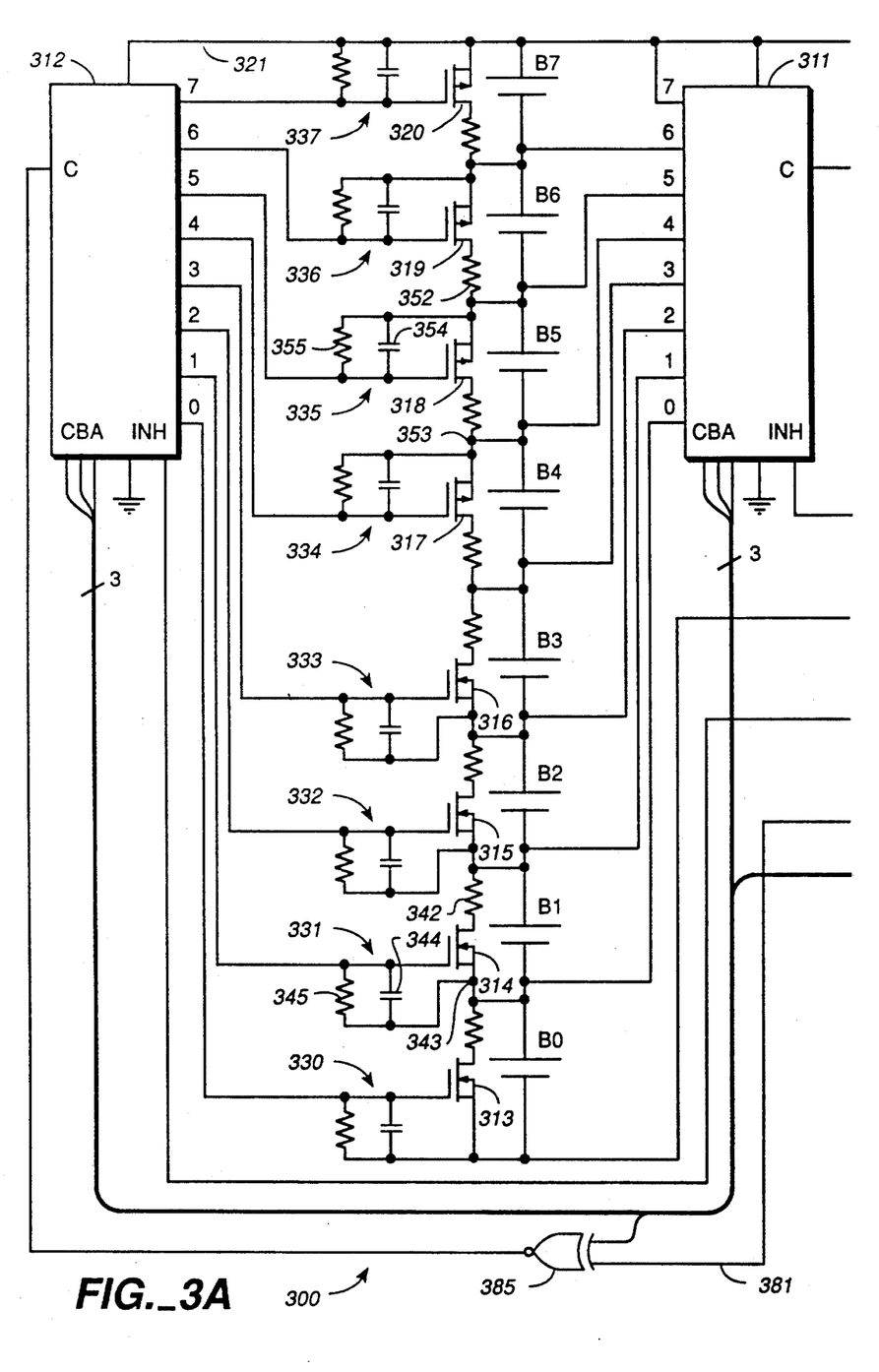

FIG. 3 is a more detailed schematic of circuit 300 in a particular embodiment of the present invention. Circuit 300 includes an eight cell subject battery 301, it being understood that this is exemplary and that the present invention is applicable to any number of cells in a subject battery. The description of this embodiment will follow an operational mode. That is, the elements of circuit 300 will be described in the context of their functions.

MONITORING—VOLTAGE SENSING

Battery 301 has cells B0-B7 in series connection. Connected between the cells are a first multiplexer switch 311 and shunt circuits 330-337. Shunt circuits 330-337 are connected to a second multiplexer switch 312. Multiplexer switches 311 and 312 are powered continuously by battery 301 without significant battery current loss because of a very small typical current leakage of about 15 nA. Typical quiescent supply current totals 30 nA at 15 volts battery voltage and is therefore insignificant. Multiplexer switches 311 and 312 are, for example, type 4051B CMOS analog multiplexer switches.

Multiplexer switch 311 has switch positions 0–6 connected between the terminals cells B0 to B7 respectively, and switch position 7 connected to $V_{BAT}$ line 321. Shunt circuits 330–337 are of two types: N-type shunt circuits 330–333 and P-type shunt circuits 334–337. N-type shunt circuits 330–333 use N-FET switches 313–316 and P-type shunt circuits use P-FET switches 317–320. Exemplary N-type shunt circuit 331 comprises an N-FET switch 314 having a drain coupled to a resistor 342 and a source coupled to a resistor 343 which is coupled to the drain of preceding N-FET switch 313 of N-type shunt circuit 330. The gate and source terminals of N-FET switch 314 are in parallel connection with a capacitor 344 and a resistor 345. Exemplary P-type shunt circuit 335 comprises a P-FET switch 318 having a drain coupled to a resistor 352 and a source coupled to a resistor 353, which is coupled to the source of preceding P-FET switch 317 of P-type shunt circuit 334. The gate of P-FET switch 318 is coupled in parallel to a capacitor 354 and a resistor 355. The series of N-type and P-type shunt circuits are connected between cells B3 and B4. N-type shunt circuits 330–333 are connected between cells B0–B3 and switch positions 0–3 of multiplexer switch 312 and P-type shunt circuits 334–337 are connected between cells B4–B7 and switch positions 4–7 of multiplexer switch 312.

A wave generator 350 is coupled to a 4-step counter 380 through an ENABLE and an AND gate 322. The frequency of wave generator 350 is determined by a resistor 396 and a capacitor 397. A 4-bit up counter 340 is coupled to generator 350 through an AND gate 323, and coupled to counter 380 through $Q_C$ and AND gate 322 to ENABLE. Counter 340 is coupled to multiplexer 311 INHIBIT through $Q_D$ and AND gate 323. Counter 340 is further coupled to multiplexer 311 through $Q_C$, $Q_B$, and $Q_A$ to C, B, and A respectively. A transistor switch 339 has a grounded source and a gate coupled to $Q_A$ of counter 380 through the output of inverting amplifier 346, XNOR gate 347, and AND gate 348. The output of inverting amplifier 346 is also coupled through an AND gate 324 to SYNCH 325. Multiplexer 311 is further coupled at C to receive switch voltage signal (C) through a resistor 356 and a capacitor 357 to the positive input of amplifier 360. The gain of amplifier 360 is determined by a resistor 362 and a resistor 363 connected between the negative input of amplifier 360 and ground. The output of amplifier 360 is coupled to switch 370, the operation of which is controlled by sample/hold signal (B), to AND gate 348 and $Q_B$ of counter 380. The opposite pole of switch 370 is coupled through capacitor 379 and then to ground.

Figure 4:
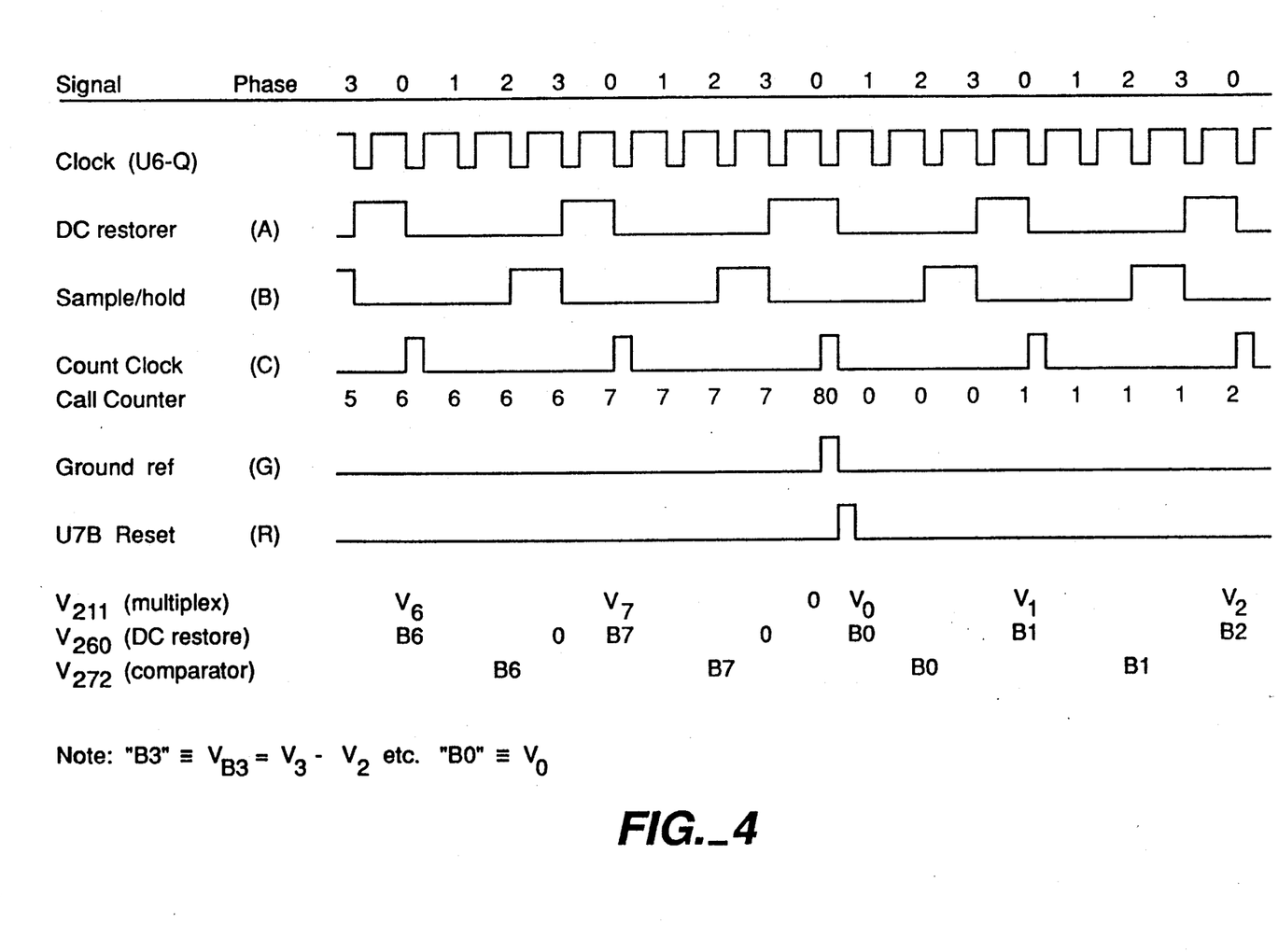
FIG. 4 is a timing diagram showing the timing functions of an embodiment of the present invention.

In operation, generator 350, powered by $V_{DD}$, generates (for example) a 3200 Hz square wave to clock counter 380 according to the timing diagram shown in FIG. 4. Intermediate voltages $V_0$ through $V_7$ are sequentially selected by multiplexer 311. $V_0$ is the voltage at the positive end of cell B0 and $V_7$ is the battery voltage $V_{BAT}$. Multiplier switch 312 selects shunt circuits 330–337. Multiplexers 311 and 312 addresses are stepped by the three Least Significant Bits of counter 340. The Most Significant Bit of counter 340 is gated to a DC reset to make counter 340 divide by 8 rather than 16.

As shown in FIG. 4 as DC restorer signal (A), switch 339 is turned on at the end of each cycle, grounding the positive input of amplifier 360 and charging capacitor 357 to the $n^{th}$ cell total voltage $V_n$. Thereafter, switch 339 shuts off and multiplexer 311 selects $V_{n+1}$. The quantity $(V_{n+1}-V_n)$, which is typically in the 1 to 3 volt range and is the $(n+1)^{th}$ cell voltage, is then present at the input of amplifier 360 which doubles it. Then closure of switch 370 saves this doubled voltage in capacitor 379 until the next cycle. The output of amplifier 372, acting as a comparator in an inverting mode, will be high, or low if the cell voltage is at or above the selected threshold.

Counter 380 is stepped on the down edge of the square wave clock signal generated by generator 350 through driving of ENABLE rather than CLOCK. This effectively provides a 2-phase clock. Counter 380, acting as a 2-phase clock, restores the zero level control of the transition from cell B7 to B0. As shown in FIG. 4, at the end of the seventh cycle, counter 340 steps to "8" when $Q_C$ of counter 380 goes high as the clock signal (Q) from generator 350 falls. The ground reference signal (G) from $Q_D$ of counter 340 goes high, thereby putting multiplexer 311 in the INHIBIT (open switch) state, grounding the select line via switch 338, and stretching the DC restore pulse at switch 339 through XNOR gate 347. The available XNOR gates 347 and 349 (spare) can be used as an OR gate without error since OR gate 348 must be low at this time. On the next rise of the clock signal from generator 350, counter 340 resets, thereby shutting off switches 338 and 339, enabling multiplexer 311, and selecting line "0" ($V_0$).

SYNCH output 325 is buffered by OR gate 324 from the gate signal (A) (DC restorer) from switch 339. The SYNCH signal therefore also has the wide pulse at the start of cycle 0. This single line, with a suitable external timer, allows a connected circuit (such as a load device with a microprocessor, not shown) to track the cell counter, identify the order of charge and discharge of an individual cell, and thus record the time of charge and discharge for each cell specifically.

The switching circuit comprising diodes 302 and 309, diodes 365, 366, and 369, switches 374, 377, and 384, transistor 305, and their associated resistors modify the connection and threshold of comparator 372 to provide the monitor and control functions for discharge, charge, and deep discharge.

The output of comparator 372 is connected to a parallel connection of a diode 365 connected to a charge control "C" at 367 and a diode 366 connected to a discharge control "D" at 368. The positive input of comparator 372 is coupled to a resistor 359, which in turn is coupled to a diode 369, which is coupled to diode 366. Resistor 359 is also coupled to switch 374 which is coupled to diode 375 and controlled by a switch 376 which is coupled to $V_{DD}$. Switch 376 selects whether switch 377 shall be on only during charging (for normal charging and discharging) or on all the time (in the deep discharge mode). Switch 377 is connected to diodes 365, 366, and 369 and to SHUNT line 381. SHUNT line 381 is connected to $V_{DD}$ through a resistor 382 and to multiplexer 312 at C through XNOR gate 385 to receive count clock signal (C). The positive input of comparator 372 is also coupled to a switch 384 through a resistor 383. The control of switch 384 is coupled to the control of switch 374 and switch 376. The other pole of switch 384 is coupled to a reference voltage 390 and to the positive input of comparator 372 through a resistor 391, and then to ground through a capacitor 392. The positive input of comparator 372 is also coupled to a resistor 387 which is coupled to ground and a resistor 388, which is coupled to a service switch 389 which is coupled to ground. Although switch 389 is shown separate from switch 376, switch 389 is another pole of switch 376.

DISCHARGE

When battery 301 is discharging, switches 374, 377, and 384 are open. The EoD voltage threshold (for example, 1.1 volts) is produced from reference voltage generator 390 and resistors 387 and 388. Approximately 0.1 volts hysteresis is applied via resistor 359. Diode 369 connects resistor 359 only when comparator 372 is low, so the threshold voltage is independent of the varying battery voltage $V_{DD} = V_{BAT}$.

For battery maintenance purposes, a reconditioning "deep discharge" (to for example, 1.0 volts/cell) can be instituted periodically after normal discharge. This is done manually by closing service switch 389. This alters the threshold of comparator 372 by the addition of shunting resistor 388. Further, the pole of switch 376 is switched from the charge-control line (the collector of transistor 305) to $V_{DD}$. This then forces switch 377 (which is normally open during discharge) to close, thereby activating shunt switches 313–320. In this mode, HEXFET gate voltage can be as low as 5 volts on switches 316 and 317, but shunt circuit 330–337 resistors draw only about 300 mA at this point. Switches 316 and 317 can desaturate since the effective values of the corresponding resistors in shunt circuits 333 and 334 are not important in this mode. No fixed current need be bypassed and comparator 372 will open the shunt whenever cells B3 and B4 reach the deep discharge level.

Following a deep discharge, the battery capacity is calculated as 3.6 dt where 3.6 amps is the rapid charge rate, d is the pulse duty factor, and t is the time in hours to first cell charge.

Circuit 300 warns of impending discharge of the weakest cell by setting the EoD voltage threshold at the end of the "plateau" region (where the voltage output goes from a steady 2.0 volts to 1.3–1.4 volts, for example) rather than at 1.1 volts as described above. This assures an early warning of discharge of the weakest cell when about 20% of usable capacity remains.

CHARGING

Charging control "C" 367 is coupled to diode 302 and through to the source of transistor 305. The collector of transistor 305 is coupled through a resistor 306 to ground and to the control line for switches 374 and 384. The base of transistor 305 is coupled to $V_{DD}$, to the positive pole of electrolytic capacitor 308 and then to ground, and to reference voltage source 390. In the other direction, the base of transistor 305 is coupled to discharge control "D" 368 through diode 309. Finally, transistor 305 is base-emitter connected through a diode 307.

In all modes of charging operation, circuit 300 is powered from $V_{BAT}$ via control line "C". Control "C" causes transistor 305 to conduct and turns on switches 374 and 384. Switch 374 allows comparator 372 to sink and source current in line "D" 368. Switch 377 enables the shunting system. Switch 384 connects resistor 383 thereby setting the EoC voltage threshold (for example, 2.0 volts). The actual comparator level from comparator 372 is twice this value. The shunting system operates through SHUNT signal line 381 through XNOR gate 385 to enable count clock signal (C) at multiplexer 312. N-FET shunt switches 313–316 shunt cells B0–B3 and P-FET shunt switches 317–320 shunt cells B4–B7. XNOR gate 385 combines the SHUNT signal (low means cell voltage high) with the $Q_C$ signal from counter 340 to produce a high gate signal for N-signal FET switches 313–316 and a low gate signal for P-FET switches 317–320. The INHIBIT line of multiplexer 312 is driven from XNOR gate 347 to assure that the SHUNT signal is valid for a given cell, and that comparator 372 has time to settle before either a high or low gate signal is applied to a FET gate. Capacitors in shunt circuits 330–337, such as capacitors 344 and 354, serve as memories to hold the FET gate voltages between cell cycles. Resistors in shunt circuits 330–337, such as resistors 345 and 355, assure that shunt circuit capacitors will remain discharged when MC circuit 300 is inactive.

In the worst case, cell B3 may overcharge and require shunting when cells B4–B7 are only at mid-charge (for example at 1.6 volts). The gate voltage available for switch 316 is then, for example, 8.4 volts, which is adequate to guarantee saturation at 400 mA. More gate voltage is available for switches 313–315. The negative OFF voltage applied to the gates of switches 314–316 has no effect. Similar conditions apply for switches 317–320.

Under rapid charge operation, as noted above, the charge may be pulsed. By definition, rapid charge ends when the first cell reaches EoC voltage as measured between pulses. During the pulse, a charger (130 in FIG. 1) sends current into line "D", raising the threshold to compensate for an expected battery ESR drop. If the value of the resistance of resistor 359 give insufficient threshold change as determined by discharge hysteresis, switch 374 can be connected to another resistor. If comparator 372 first goes low between pulses, normal rapid charge is completed. If comparator 372 goes low during the pulse, the given cell has excessive ESR and battery 301 requires maintenance.

Under top-up charge operation, when the "D" line 368 has gone low for one cell, charger current is cut to a lower charging rate (for example, C/20, which is a twenty hour charge) which is continuous. Resistors such as 345 and 355 in shunt circuits 330–337 keep fully charged cells from overcharging. When the "D" line stays low through all the cells B0–B7 or, as a redundant safety feature, when the total $V_{BAT}$ exceeds battery 301's voltage (for example, 16 volts for an 8 cell battery), battery 301 is fully charged and charging terminates.

MODIFICATIONS

In many applications, there is only one type of load on the battery. In such cases, a slight modification of circuit 300 can provide a charge state indicator. This can be achieved without the need of the complication and power loss of direct current sensing and/or built-in computational capability. A 4-bit up-down counter having a display can be added to circuit 300 connected to service switch 389. After a deep discharge cycle is terminated, service switch 389 resets the counter to "0". Using an appropriate scale factor, the charger steps the counter up during rapid charge. The final reading shows the batter capacity. Since the load is only of one type, the load current is known or calculable. Based on the load current, the load device issues step-down pulses to the counter. The counter thereby displays the charge state of the battery. This charge state is as accurate as a current sensor in the battery and does not require a local microprocessor. It further provides, through the rest of circuit 300, the cell-by-cell monitoring.

The 8 cell embodiment of the present invention described in FIG. 3 can be modified to operate on 9, 12, and 4-6 cell batteries as shown following, and for other type batteries using variations of the modifications described below.

Video cameras and VCRs using a nominal 12 volt power source have the further requirement that it not run down to the 8.8 volt EoD point of 8 cell batteries. Using 9 cells, the CMOS 18 volt maximum will be exceeded during rapid charge pulses due to ESR drop. This problem can be solved by leaving multiplexers 311 and 312 (of FIG. 3) connected as for 8 cells, but switching resistor 356 between multiplexer 311 and the $9^{th}$ cell ($+V_{BAT}$) with one section of a 3PDT switch. A 3PDT switch, powered between $V_0$ and $V_{BAT}$, is across 8 cells (the differential discharge is insignificant). Since the output of multiplexer 311 does not go below $V_0$, it does not outrange the 3PDT switch. Switch 338 can easily handle the voltage. Counter 340 is connected for a 9 count and its $Q_D$ drives the 3PDT switch through a diode-resistor to avoid pulling its gates below $V_D$. The shunt logic is handled similarly using other 3PDT sections.

12 cells, it is preferable to multiplex both sense and shunt for the bottom four cells with another multiplexer switch and switch between the bottom four and top eight cells. Overlap will exist between ground-based control signals and the "upper" switches. N-FETs can be used for the bottom eight cells, which will reduce costs.

For 4-6 cells, the EoD voltage is too low to operate the operational amplifiers, reference supply, and shunt the FETs. A charge-pump booster (driven from the clock) is required when the circuit is active. Only N-FETs are required and the XNOR shunt logic is not needed. Steering diodes hold multiplexers 311 and 312 up to $V_{BAT}$ in standby and pull them up to "boost" while running to allow multiplexer 312 to pull FET gates above $V_{BAT}$.

Various specific components can be used in the circuits described as long as they provide the operability required. Such components and their specifications are known in the electronic arts and variations and combinations achieving the functionality herein described are understood to be within the scope of this invention.

While the above description provides a full and complete description of the preferred embodiments of the present invention, various modifications, alternate constructions, and equivalents may be employed while still remaining within the scope of the invention. For example, although the description was with respect to an 8-cell battery with little overcharge tolerance, the present invention is applicable to any multicell battery where monitoring and control of discharge and charge are desired. Therefore, the above description and illustrations should not be construed as limiting the scope of the invention which is defined by the following claims.

I claim:

1. A cell monitoring and control circuit for a rechargeable multicell battery, comprising:
    a multiplexed cell access switch means coupled to the cells of the battery for sequentially electronically accessing individual cells of the battery; and
    a monitoring and control circuit means powered by the battery, coupled to said cell access switch means for sequential connection to the cells of the battery, for sensing the voltage state of each cell and for controlling the charging of each cell by an external charging means, said monitoring and control circuit means constituting substantially no power drain on the battery when the battery is idle.

2. The circuit of claim 1 wherein said monitoring and control circuit means includes means for determining when each individual cell of the battery has reached its End of Discharge (EoD) voltage and an EoD signaling means for the individual cells of the battery.

3. The circuit of claim 1 wherein said monitoring and control circuit means includes means for determining when each individual cell of the battery has reached its End of Charge (EoC) voltage and an EoC signaling means for the individual cells of the battery.

4. The circuit of claim 1 wherein said monitoring and control circuit is adapted to control an external charging means which provides variable charging rates for rapid charging and for top-up charging of the individual cells of the battery.

5. The circuit of claim 4 wherein said monitoring and control circuit is adapted to control an external charging means which provides pulsed rapid charging of the individual cells of the battery.

6. The circuit of claim 1 wherein said monitoring and control circuit means includes detecting means for determining the presence of a defective cell, said detecting means comprising means for determining when there is excessive dynamic resistance to charging of a cell of the battery.

7. The cell monitoring and control circuit of claim 1 further comprising means for controlling a deep discharge of the individual cells of the battery.

8. The circuit of claim 1 wherein said monitoring and control circuit is adapted to be coupled to an external power source for providing electric power to said circuit.

9. A cell monitoring and control circuit for a rechargeable multicell battery, comprising:
    a cell select switch means coupled to the cells of the battery for selecting individual cells of the battery;
    a cell shunt means coupled to the cells of the battery for shunting individual cells of the battery;
    a clock-counter means coupled to said cell select switch means for sequentially incrementing selection of the individual cells of the battery;
    a capacitive coupler means, coupled to said cell select switch means, for sequentially temporarily storing the voltages at individual cells between selected clock-counter cycles;
    a ground level restorer means coupled to said capacitive coupler means for reducing the stored voltages to a ground reference; and,
    means for comparing the reduced voltages from said restorer means with predetermined reference voltages.

10. The cell monitoring and control circuit of claim 9 wherein said circuit is powered by the battery when the battery is discharging and when the battery is being charged, and said circuit operation constitutes substantially no power drain on the battery when the battery is idle.

11. The cell monitoring and control circuit of claim 9 further comprising a charge state indicator means including a counter means stepped by said charger providing a measure of battery capacity and a given current load on the battery in combination with said battery capacity thereby providing a measure of the battery charge status.

12. The cell monitoring and control circuit of claim 9 further comprising coupling means for coupling said circuit to an external charging means for charging the individual cells of the battery and control means to control said external charging means.

13. The cell monitoring and control circuit of claim 12 wherein said control means is adapted to control an external charging means which provides variable charging rates for rapid charging and for top-up charging.

14. The cell monitoring and control circuit of claim 12 wherein said control means is adapted to control an external charging means which provides pulsed rapid charging of the individual cells of the battery.

15. The cell monitoring and control circuit of claim 12 further comprising detecting means for determining the presence of a defective cell, said detecting means comprising means for determining when there is excessive dynamic resistance to charging of a cell of the battery.

16. The cell monitoring and control circuit of claim 9 wherein said reference voltage generator provides a reference voltage for deep discharge and further comprising means for connecting said cell shunt means to the individual cells of the battery to cause a deep discharge of the individual cells of the battery.

17. The cell monitoring and control circuit of claim 9 further comprising coupling means for coupling said circuit to an external power source for providing electric power to said circuit.

18. The cell monitoring and control circuit of claim 9 further comprising a sample and hold circuit coupled to said restorer means for sampling and holding the voltages of the individual cells of the battery;

a reference voltage generator coupled to said sample and hold circuit for generating reference voltages; and wherein said means for comparing comprises a comparator means, coupled to said sample and hold circuit and coupled to said reference voltage generator, for comparing selected voltages of the cells of the battery to reference voltages generated by said reference voltage generator, and for providing a signal whenever the voltage of a cell is beyond the limits of said reference voltages.

* * * * *